United States Patent
Park et al.

(10) Patent No.: US 8,948,526 B2
(45) Date of Patent: Feb. 3, 2015

(54) METHOD AND APPARATUS FOR ENCODING BINARY IMAGE USING ADAPTIVE TEMPLATE AND METHOD AND APPARATUS FOR DECODING THE SAME

(71) Applicant: Samsung Electronics Co., Ltd., Suwon-si (KR)

(72) Inventors: Sung-bum Park, Seongnam-si (KR); Jae-won Yoon, Seoul (KR); Dai-woong Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 13/692,340

(22) Filed: Dec. 3, 2012

(65) Prior Publication Data

US 2013/0142448 A1 Jun. 6, 2013

(30) Foreign Application Priority Data

Dec. 2, 2011 (KR) .................. 10-2011-0128531

(51) Int. Cl.
*G06K 9/36* (2006.01)
*H04N 19/13* (2014.01)
*H04N 19/14* (2014.01)
*H04N 19/91* (2014.01)
*H04N 19/105* (2014.01)

(52) U.S. Cl.
CPC ............ *G06K 9/36* (2013.01); *H04N 19/00121* (2013.01); *H04N 19/00157* (2013.01); *H04N 19/00951* (2013.01); *H04N 19/00024* (2013.01)

USPC ............................................... 382/232

(58) Field of Classification Search
USPC .................. 382/232, 239, 243; 358/3.06
See application file for complete search history.

(56) References Cited

U.S. PATENT DOCUMENTS

| | | |
|---|---|---|
| 2008/0219578 A1 | 9/2008 | Lee |
| 2008/0232706 A1 | 9/2008 | Lee et al. |
| 2009/0169123 A1 | 7/2009 | Park et al. |
| 2013/0058585 A1 | 3/2013 | Lim et al. |

FOREIGN PATENT DOCUMENTS

KR 10-2011-0123689 11/2011

OTHER PUBLICATIONS

Communication dated Jan. 29, 2013 issued by the International Searching Authority in counterpart International Patent Application No. PCT/KR2012/010338.

*Primary Examiner* — Duy M Dang
(74) *Attorney, Agent, or Firm* — Sughrue Mion, PLLC (57) ABSTRACT

Provided are binary image encoding and decoding methods and binary image encoding and decoding apparatuses using an adaptive template. The binary image encoding method includes: applying a window having a predetermined size and shape to a predetermined number of previous pixels and peripheral pixels of the previous pixels, and acquiring correlations between the previous pixels and the peripheral pixels within the window; determining relative locations having high correlation with the previous pixels within the window based on the acquired correlations; generating a template based on the determined relative locations; and performing binary arithmetic encoding on a current pixel by using the generated template.

19 Claims, 9 Drawing Sheets

$$AC(S_n) = \sum_i C(S_{n-i})$$

FIG. 12

METHOD AND APPARATUS FOR ENCODING BINARY IMAGE USING ADAPTIVE TEMPLATE AND METHOD AND APPARATUS FOR DECODING THE SAME

CROSS-REFERENCE TO RELATED PATENT APPLICATION

This application claims priority from Korean Patent Application No. 10-2011-128531, filed on Dec. 2, 2011 in the Korean Intellectual Property Office, the disclosure of which is incorporated herein in its entirety by reference.

BACKGROUND

1. Field

Apparatuses and methods consistent with exemplary embodiments relate to encoding and decoding of a binary image.

2. Description of the Related Art

Since each symbol (i.e., bit) of a binary image has a value of "0" or "1," it is difficult to apply a conversion-based compression method or a prediction-based compression method to the binary image. Thus, a lossless compression method that uses binary arithmetic coding (BAC) is mainly used to encode the binary image without employing a prediction process in a related art. Examples of the lossless compression method used to encode the binary image include modified Huffman (MH), modified READ (MR), modified modified READ (MMR), Joint Bi-level Image Experts group (JBIG), and the like. The MH and MMR are encoding algorithms applied to G3 and G4 facsimile machines. The JBIG compression is a context-based arithmetic coding algorithm.

A BAC algorithm such as the related art JBIG compression is used to perform context-based coding in order to enhance compression performance. Context refers to a condition of symbols near a current symbol. The related art JBIG generates context of the current symbol by applying a template having invariable size and shape. Furthermore, JBIG2, which is an extension of the related art JBIG compression, increases arithmetic operation complexity in calculating context by increasing the size of the template.

SUMMARY

One or more exemplary embodiments generate a template used to generate context for binary arithmetic coding (BAC) according to correlations between a current symbol and peripheral symbols, thereby reducing arithmetic operation complexity of the BAC.

One or more exemplary embodiments also adaptively generate a template by using previously processed symbols at encoding and decoding sides without separate information.

According to an aspect of an exemplary embodiment, there is provided a binary image encoding method using an adaptive template, the method including: applying a window having a predetermined size and shape to a predetermined number of previous pixels and peripheral pixels of the previous pixels, and acquiring correlations between the previous pixels and the peripheral pixels within the window; determining relative locations having high correlation with the previous pixels within the window based on the acquired correlations; generating a template based on the determined relative locations; and performing the binary arithmetic encoding on a current pixel by using the generated template.

According to an aspect of another exemplary embodiment, there is provided a binary image decoding method using an adaptive template, the method including: applying a window having a predetermined size and shape to a predetermined number of previous pixels and peripheral pixels of the previous pixels, and acquiring correlations between the previous pixels and the peripheral pixels within the window; determining relative locations having high correlation with the previous pixels within the window based on the acquired correlations; generating a template based on the determined relative locations; and performing the binary arithmetic decoding on a current pixel by using the generated template.

According to an aspect of another exemplary embodiment, there is provided a binary image encoding apparatus using an adaptive template, the apparatus including: a correlation acquisition unit for applying a window having a predetermined size and shape to a predetermined number of previous pixels and peripheral pixels of the previous pixels, and acquiring correlations between the previous pixels and the peripheral pixels within the window; a correlation accumulation unit for determining relative locations having high correlation with the previous pixels within the window based on the acquired correlations; a template renewal unit for generating a template based on the determined relative locations; and an arithmetic encoding unit for performing the binary arithmetic encoding on a current pixel by using the generated template.

According to an aspect of another exemplary embodiment, there is provided a binary image decoding apparatus using an adaptive template, the apparatus including: a correlation acquisition unit for applying a window having a predetermined size and shape to a predetermined number of previous pixels and peripheral pixels of the previous pixels, and acquiring correlations between the previous pixels and the peripheral pixels within the window; a correlation accumulation unit for determining relative locations having high correlation with the previous pixels within the window based on the acquired correlations; a template renewal unit for generating a template based on the determined relative locations; and an arithmetic decoding unit for performing the binary arithmetic decoding on a current pixel by using the generated template.

According to an aspect of another exemplary embodiment, there is provided a binary image encoding or decoding method using an adaptive template, the method including: adaptively generating a template based on correlations between previous pixels and peripheral pixels; and performing binary encoding or decoding on a current pixel by using the generated template.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings, in which like reference numerals refer to like elements throughout.

Each pixel or symbol constituting a binary image has a value of "0" or "1." Based on a Markov coding model, a probability that a current pixel $S_i$ (where $i$ is an integer) to be encoded has a value of "0" or "1" may be a conditional probability having values of a predetermined M (where M is an integer) number of previous pixels $S_{i-1}, S_{i-2}, \ldots, S_{i-M}$ as conditions. In this regard, values of the predetermined M number of previous pixels $S_{i-1}, S_{1-2}, \ldots, S_{i-M}$ are conditions indicating a peripheral environment of the current pixel $S_i$ and are defined as context. Based on the context, i.e., 2^M cases which the M number of peripheral pixels may have, a probability value of the current pixel $S_i$ having a value of 0 or 1 is determined, and binary arithmetic coding (BAC) is performed based on the determined probability value.

Peripheral pixels are selected so as to perform context modeling. That is, the number of peripheral pixels and the location of peripheral pixels considered as context are used in order to efficiently reflect correlations between a current pixel and peripheral pixels. In general, an arrangement of peripheral pixels constituting context with respect to a current pixel is defined as a template.

Figure 2A:
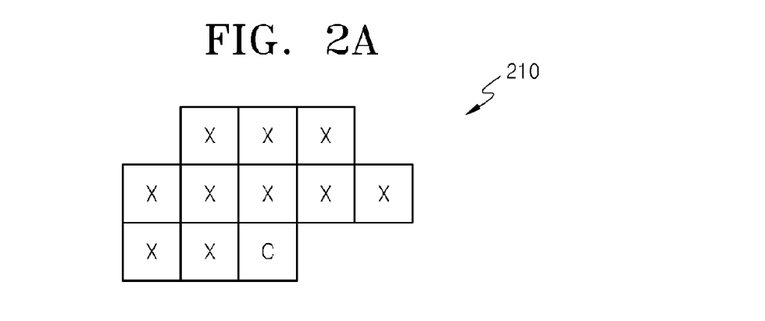
FIGS. 2A and 2B are reference diagrams of examples of templates used in a technical field related to an exemplary embodiment.
Figure 2B:
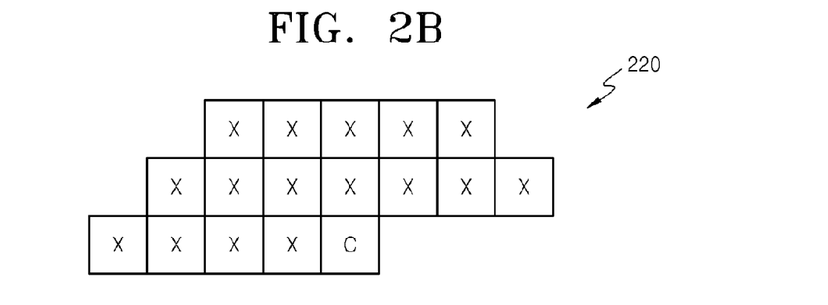

FIGS. 2A and 2B are reference diagrams of examples of templates 210 and 220 used in a technical field related to an exemplary embodiment. Referring to FIG. 2A, a first template 210 is used in Joint Bi-level Image Experts group (JBIG) compression. Referring to FIG. 2B, a second template 220 is used in JBIG2 compression. Referring to FIGS. 2A and 2B, pixels marked as "C" are current pixels to be encoded, and pixels marked as "X" are peripheral pixels used as context of the current pixels C. The first template 210 used in the JBIG compression is a template including 10 peripheral pixels. The second template 220 used in the JBIG2 compression is a template including 16 peripheral pixels. In this way, context is generated by using an invariable template in a relevant field. However, if a template having an invariable size and shape is used all the time, a pixel having little correlation with a current pixel is also used to generate context, which increases arithmetic operation complexity. However, an exemplary embodiment provides a method of generating a template including peripheral pixels having high correlation based on the correlation between pixels.

Figure 1:
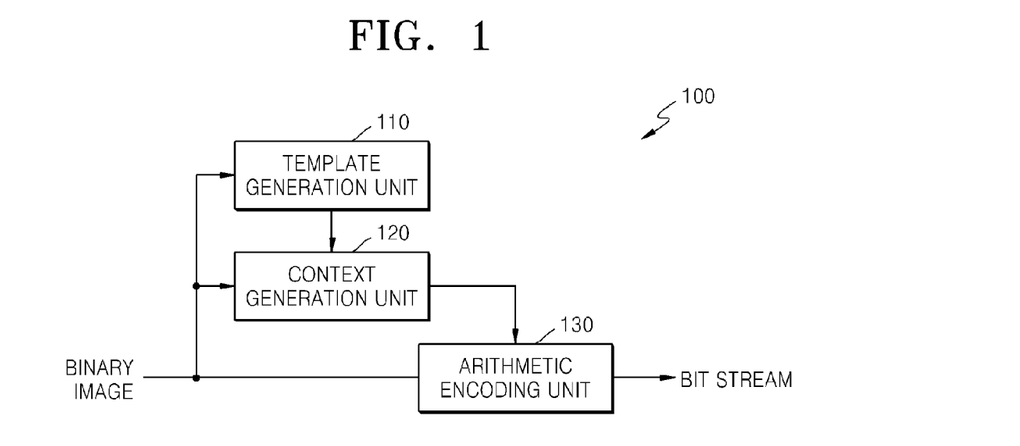
FIG. 1 is a block diagram of a binary image encoding apparatus according to an exemplary embodiment.

FIG. 1 is a block diagram of a binary image encoding apparatus 100 according to an exemplary embodiment.

Referring to FIG. 1, the binary image encoding apparatus 100 includes a template generation unit 110 (e.g., template generator), a context generation unit 120 (e.g., context generator), and an arithmetic encoding unit 130 (e.g., arithmetic encoder).

The template generation unit 110 applies a window having a predetermined size and shape to a predetermined number of previous pixels and peripheral pixels of the previous pixels, acquires a correlation between each previous pixel and each peripheral pixel within the window, determines relative locations having high correlation with the previous pixels within the window based on the acquired correlation, and generates a template based on the relative locations having high correlation with the previous pixels within the window.

The context generation unit 120 determines a most probable symbol (MPS) and a least probable symbol (LPS) from among binary signals of "0" and "1" and acquires probabilities that the determined MPS and LPS take place according to context determined based on peripheral pixels of a current pixel within the template.

The arithmetic encoding unit 130 performs binary arithmetic encoding on the current pixel based on the probabilities that the MPS and LPS take place.

A detailed operation of the template generation unit 110 of FIG. 1 according to one or more exemplary embodiments will now be described with reference to FIGS. 3 through 7.

Figure 3:
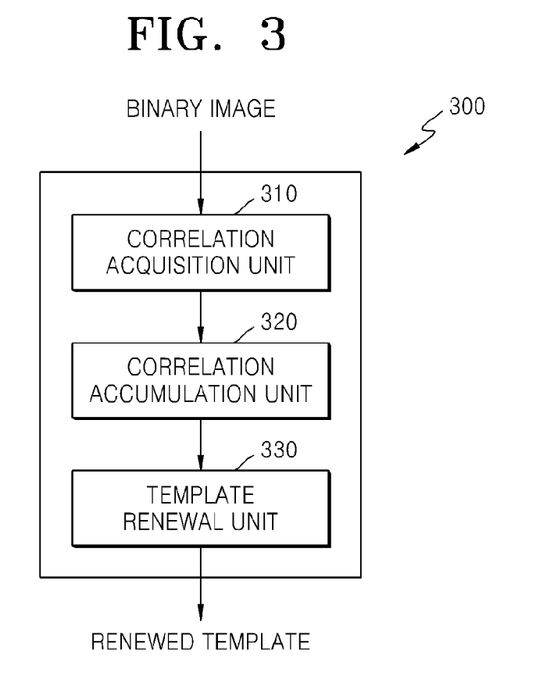
FIG. 3 is a block diagram of a template generation unit of FIG. 1 according to an exemplary embodiment.

FIG. 3 is a block diagram of a template generation unit 300 (e.g., template generator) according to an exemplary embodiment.

Referring to FIG. 3, the template generation unit 300 includes a correlation acquisition unit 310 (e.g., correlation acquirer), a correlation accumulation unit 320 (e.g., correlation accumulator), and a template renewal unit 330 (e.g., template renewer).

The correlation acquisition unit 310 applies a window having a predetermined size and shape to a predetermined number of previous pixels and peripheral pixels of the previous pixels, and acquires a correlation between each previous pixel and each peripheral pixel within the window. The size and shape of the window may be optional or variable, and may be previously determined at encoding and decoding sides.

The correlation accumulation unit 320 determines relative locations having high correlation with the previous pixels within the window based on the correlation between each previous pixel and each peripheral pixel within the window. For example, the correlation accumulation unit 320 may determine a location having a correlation that exceeds a predetermined threshold or having a correlation that is among a predetermined number of highest correlations as a location having a high correlation.

The template renewal unit 330 generates a template based on the relative locations having high correlation with the previous pixels within the window. As will be described below, the template renewal unit 330 may determine relative locations having high correlation accumulation values calculated by applying the window to the previous pixels, and generate a template only including relative locations having correlation accumulation values that exceed a predetermined threshold within the window.

Figure 4:
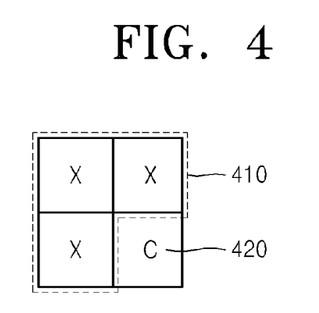
FIG. 4 is a reference diagram of a window used to calculate a correlation according to an exemplary embodiment.

FIG. 4 is a reference diagram of a window 410 used to calculate a correlation according to an exemplary embodiment. For convenience of description, although the window 410 includes only thee peripheral pixels X of a current pixel C 420, it is understood that one or more other exemplary embodiments are not limited thereto, and any number of peripheral pixels X may be included in the window 410. The window 410 may use the first and second templates 210 and 220 shown in FIGS. 2A and 2B, respectively, or may be previously determined as having various shapes.

FIGS. 5A through 5E are reference diagrams for describing a correlation calculation process according to an exemplary embodiment. The window 410 shown in FIG. 4 is used to describe the correlation calculation process in the present exemplary embodiment.

The correlation acquisition unit 310 applies a predetermined window 510 to a predetermined M (where M is an integer) number of previous pixels $S_{n-1}$, $S_{n-2}$, ... $S_{n-M}$, and acquires correlations between each of the previous pixels $S_{n-1}$, $S_{n-2}$, ..., $S_{n-M}$ and each peripheral pixel within the window, in order to generate a template applied to a current pixel $S_n$. Although a case where M=5 will now be described below, the number of the previous pixels $S_{n-1}$, $S_{n-2}$, ..., $S_{n-M}$ considered to generate the template is not limited thereto but may be optionally or variably determined.

Figure 5A:
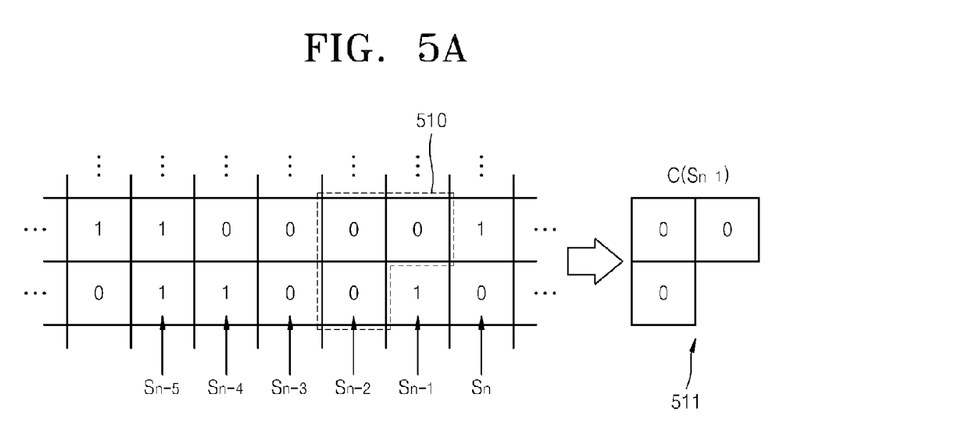
FIGS. 5A through 5E are reference diagrams for describing a correlation calculation process according to an exemplary embodiment.

Referring to FIG. 5A, the correlation acquisition unit 310 applies the window 510 to peripheral pixels of the previous pixel $S_{n-1}$. The correlation acquisition unit 310 acquires correlations $C(S_{n-1})$ 511 between the previous pixel $S_{n-1}$ and the peripheral pixels thereof by allocating a value of 1 to the peripheral pixels having the same pixel value as the previous pixel $S_{n-1}$ and allocating a value of 0 to the peripheral pixels having different pixel values from the previous pixel $S_{n-1}$ from among the peripheral pixels within the window 510. In FIG. 5A, since the previous pixel $S_{n-1}$ has a value of 1, and all the peripheral pixels within the window 510 have a value of 0, the correlations $C(S_{n-1})$ 511 between the previous pixel $S_{n-1}$ and the peripheral pixels thereof have a value of 0.

Figure 5B:
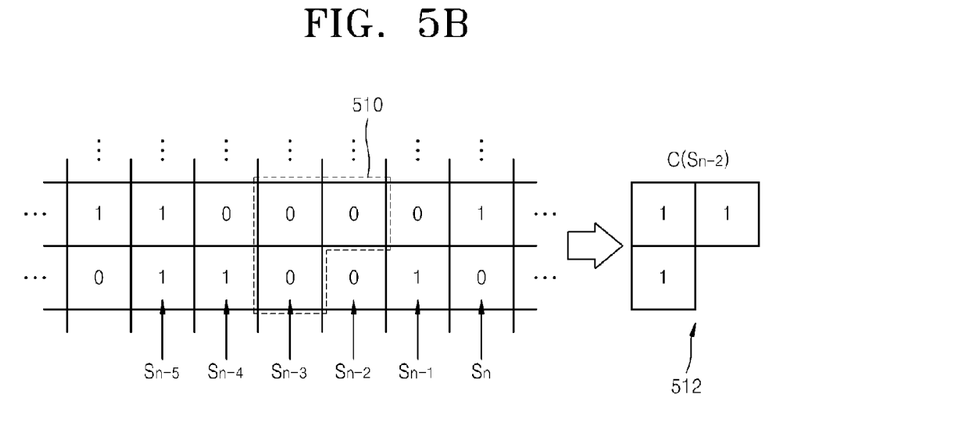

Referring to FIG. 5B, the correlation acquisition unit 310 applies the window 510 to peripheral pixels of the previous pixel $S_{n-2}$. Similarly to a process of acquiring the correlations $C(S_{n-1})$ 511 between the previous pixel $S_{n-1}$ and the peripheral pixels thereof, the correlation acquisition unit 310 acquires correlations $C(S_{n-2})$ 512 between the previous pixel $S_{n-2}$ and the peripheral pixels thereof by setting values of the peripheral pixels having the same pixel value as the previous pixel $S_{n-2}$ as 1 and setting values of the peripheral pixels having different pixel values from the previous pixel $S_{n-2}$ as 0 from among the peripheral pixels within the window 510. In FIG. 5B, since the previous pixel $S_{n-2}$ and the peripheral pixels within the window 510 have a value of 0, the correlations $C(S_{n-2})$ 512 between the previous pixel $S_{n-2}$ and the peripheral pixels thereof have a value of 1.

Figure 5C:
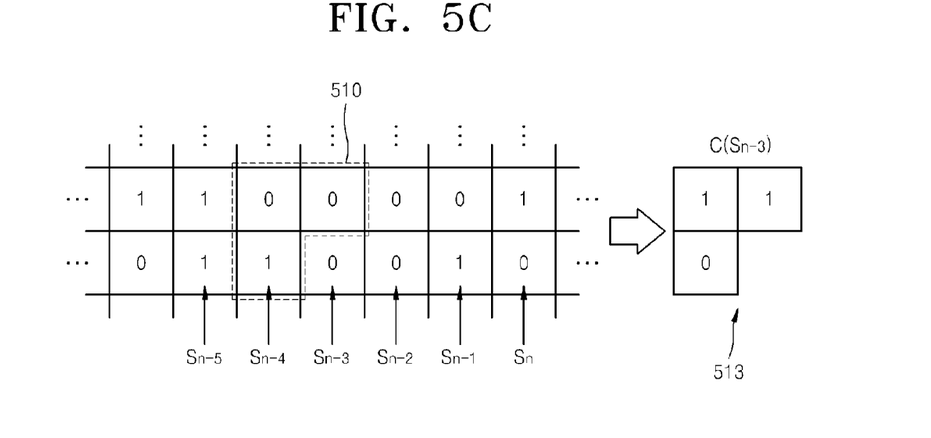

Similarly, referring to FIG. 5C, the correlation acquisition unit 310 applies the window 510 to peripheral pixels of a previous pixel $S_{n-3}$. In FIG. 5C, since the previous pixel $S_{n-3}$ has a value of 0, and the top and top left peripheral pixels in the window 510 have a value of 0, correlations $C(S_{n-3})$ 513 between the previous pixel $S_{n-3}$ and the peripheral pixels at the top and top left of the window 510 have a value of 1.

Figure 5D:
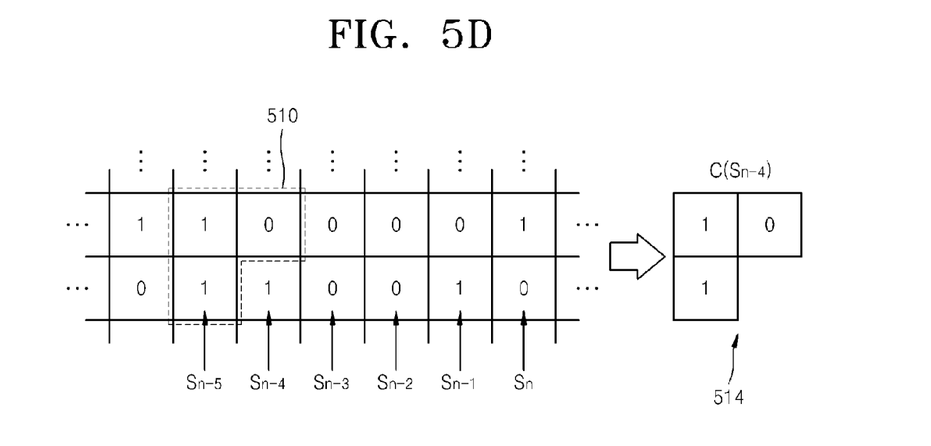

Referring to FIG. 5D, the correlation acquisition unit 310 applies the window 510 to peripheral pixels of a previous pixel $S_{n-4}$. In FIG. 5D, since the previous pixel $S_{n-4}$ has a value of 1, and the top left and left peripheral pixels in the window 510 have a value of 1, correlations $C(S_{n-4})$ 514 between the previous pixel $S_{n-4}$ and the peripheral pixels at the top left and top of the window 510 have a value of 1.

Figure 5E:
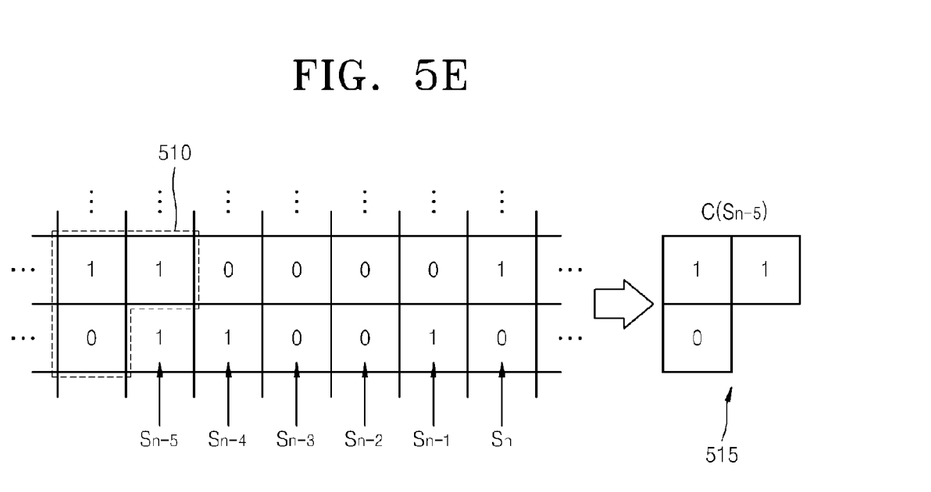

Referring to FIG. 5E, the correlation acquisition unit 310 applies the window 510 to peripheral pixels of a previous pixel $S_{n-5}$. In FIG. 5E, since the previous pixel $S_{n-5}$ has a value of 1, and the top and top left peripheral pixels in the window 510 have a value of 1, correlations $C(S_{n-5})$ 515 between the previous pixel $S_{n-5}$ and the peripheral pixels at the top and top left of the window 510 have a value of 1.

Figure 6:
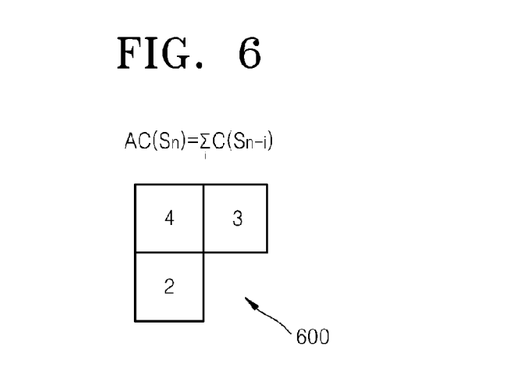
FIG. 6 illustrates an example of correlation accumulation values with respect to locations within a window according to an exemplary embodiment.

As described above, if the correlations $C(S_{n-1})$, $C(S_{n-2})$, ..., $C(S_{n-M})$ between the predetermined M number of the previous pixels $S_{n-1}$, $S_{n-2}$, ..., $S_{n-M}$ and the peripheral pixels thereof within the window 510 are acquired, the correlation accumulation unit 320 acquires correlation accumulation values with respect to relative locations within the window 510 by accumulating the correlations $C(S_{n-1})$, $C(S_{n-2})$, ..., $C(S_{n-M})$ based on the relative locations within the window 510. For example, if the correlations $C(S_{n-1})$, $C(S_{n-2})$, ..., $C(S_{n-M})$ with respect to the 5 previous pixels $S_{n-1}$, $S_{n-2}$, ..., $S_{n-M}$ are acquired as shown in FIG. 5A through 5E, the correlation accumulation unit 320 acquires correlation accumulation values with respect to relative locations within a window 600 by accumulating correlations at the same location as shown in FIG. 6.

Figure 7:
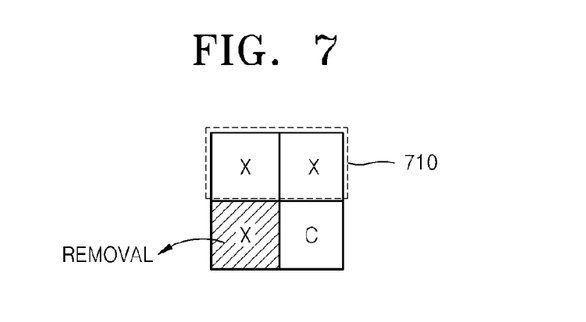
FIG. 7 illustrates an example of a template generated according to an exemplary embodiment.

The template renewal unit 330 determines the relative locations having high correlation with previous pixels within the window 600 based on the correlation accumulation values. For example, as shown in FIG. 6, the template renewal unit 330 determines locations having values greater than a predetermined threshold from among the correlation accumulation values with respect to the locations within the window 600. If the threshold is 3, as shown in FIG. 7, the template renewal unit 330 generates a template 710 by selecting top and top left peripheral pixels having correlation accumulation values greater than 3, and removes a left peripheral pixel from the window 600.

In other words, the correlation acquisition unit 310 applies a predetermined window to peripheral pixels of previous pixels $S_{n-i}$ and, if the peripheral pixel at a location (dx, dy) of the window is $S_{n-1}$(dx, dy), acquires correlations b(n−1, dx, dy) between each of the previous pixels and the peripheral pixel $S_{n-1}$(dx, dy) at the location (dx, dy) of the window according to equation 1 below:

$$b(n-i, dx, dy) = \begin{pmatrix} 1, & \text{if } S_{n-1} = S_{n-1}(dx, dy) \\ 0, & \text{otherwise} \end{pmatrix} \quad \text{[Equation 1]}$$

The correlation accumulation unit 320 may acquire correlation accumulation values with respect to a value of the location (dx, dy) by accumulating correlations calculated for a predetermined M number of previous pixels according to equation 1 above. The template renewal unit 330 determines the location (dx, dy) having a correlation accumulation value greater than a predetermined threshold from among all locations within the window, and generates and outputs a template having the determined location (dx, dy).

As described above, according to the present exemplary embodiment, locations having high correlation within a predetermined window are determined based on correlation accumulation values calculated by applying the window to previous pixels, thereby adaptively generating a template. Also, the template can be generated in a decoding side through the same process, such that it is unnecessary to transmit information regarding the template. According to an exemplary embodiment, information regarding at least one of the predetermined threshold and the predetermined size and shape of the window may be transmitted to the decoding side, although it is understood that one or more other exemplary embodiments are not limited thereto. For example, according to another exemplary embodiment, any of the predetermined threshold and the predetermined size and shape of the window may be predetermined between the encoder side and the decoder side.

Meanwhile, although a window is applied to previous pixels of a current pixel above, a correlation $C(S_n)$ calculated by applying the window to a current pixel $S_n$ may be additionally used to calculate correlation accumulation values. In this case, information regarding the correlation $C(S_n)$ calculated with respect to the current pixel $S_n$ may be added to a bit stream in order to generate the template at the decoding side. If no window is applied, such as pixels near a boundary of a frame, a previously set template may be used.

Figure 8:
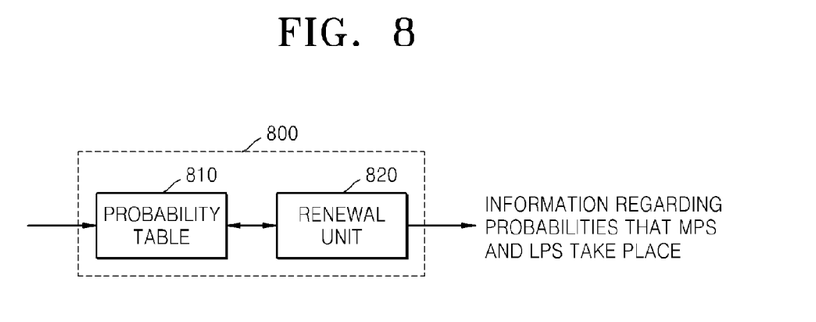
FIG. 8 is a block diagram of a context generation unit of FIG. 1 according to an exemplary embodiment.

FIG. 8 is a block diagram of a context generation unit 800 (e.g., context generator) of FIG. 1 according to an exemplary embodiment.

Referring to FIG. 8, the context generation unit 800 generates context based on peripheral pixels included in a template generated by the template generation unit 110, and acquires and outputs information regarding an MPS and an LPS according to the context and information regarding probabilities that the MPS and the LPS take place based on a predetermined probability table 810. The probability table 810 may include the probability that the LPS takes place and the information regarding the MPS, based on status information of the context obtained from the template. A value obtained by summing the probabilities that the MPS and LPS take place is 1, and thus if the probability that the LPS takes place is known, the probability that the MPS takes place may be acquired. A renewal unit 820 (e.g., renewer) may renew the context by renewing probability index information referred to by the context in the probability table 810 according to a current pixel value. The operation of the context generation unit 800 may be similar to that of a context generation unit used in the JBIG or the JBIG2 compression, and thus a detailed description thereof is omitted here.

Figure 9:
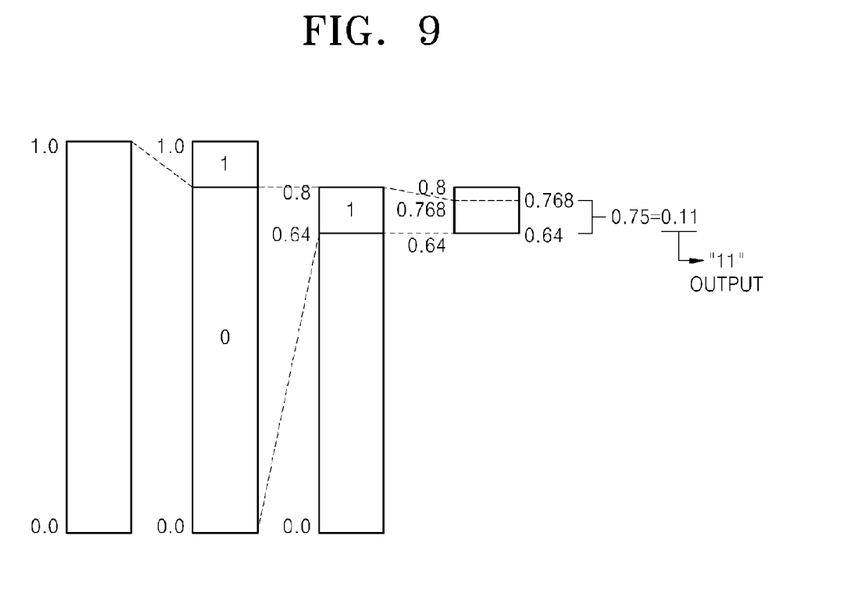
FIG. 9 is a reference diagram for describing a binary image encoding process according to an exemplary embodiment.

FIG. 9 is a reference diagram for describing a binary image encoding process according to an exemplary embodiment. It is assumed in FIG. 9 that pixel values of a binary image that is to be encoded are "010," an occurrence probability of 1 is 0.2, and an occurrence probability of 0 is 0.8. In this regard, the occurrence probabilities of 1 and 0 are output by the context generation unit 120 by using context generated based on a template generated by the template generation unit 110 as described above. Although the occurrence probabilities of 1 and 0 have different values according to the context, it is assumed for convenience of description that the occurrence probabilities of 1 and 0 are the same with respect to the pixel values of the binary image.

Referring to FIG. 9, if a first empty digit "0" of the binary image value "010" is encoded, [0.0~0.8] that occupies 80% of the bottom of an initial section [0.0~1.0] is renewed as a new section. If a second empty digit "1" of the binary image value "010" is encoded, [0.64~0.8] that occupies 20% of the top of the section [0.0~0.8] is renewed as a new section. If a third empty digit "0" of the binary image value "010" is encoded, [0.64~0.768] that occupies 80% of the bottom of the section [0.64~0.8] is renewed as a new section. In a binary number 0.11 corresponding to an actual number 0.75 included in the final section [0.64~0.768], "11" below the decimal point excluding a first digit 0 is output as a bit stream corresponding to the binary image value "010."

Figure 10:
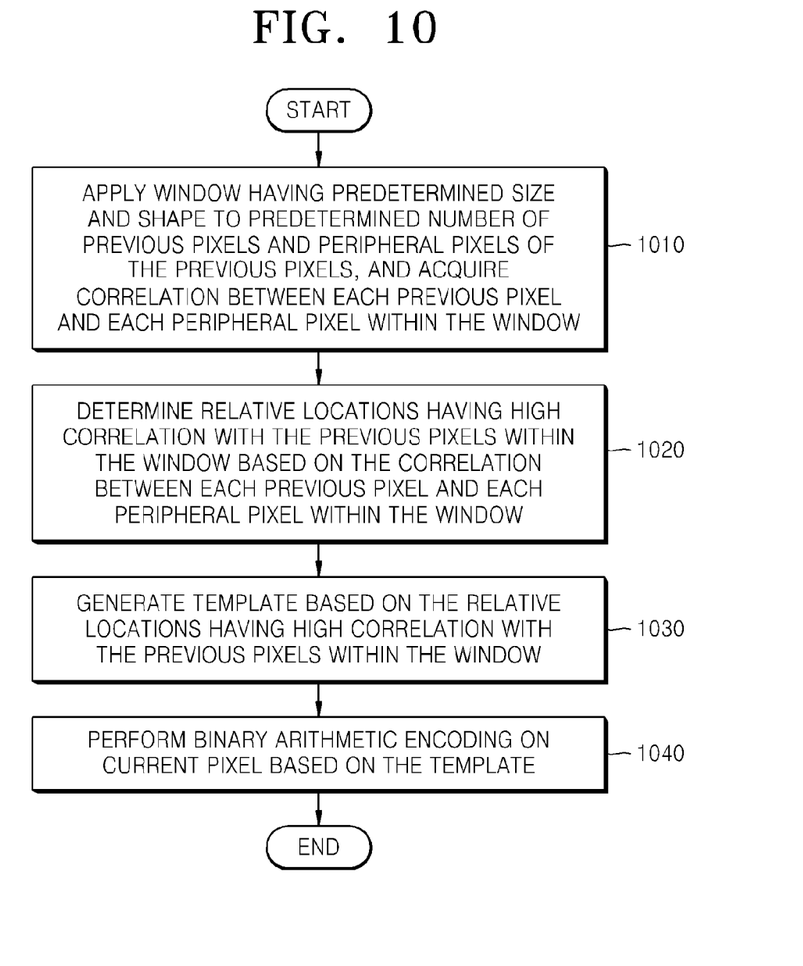
FIG. 10 is a flowchart of a binary image encoding method using an adaptive template according to an exemplary embodiment.

FIG. 10 is a flowchart of a binary image encoding method using an adaptive template according to an exemplary embodiment.

Referring to FIG. 10, in operation 1010, the correlation acquisition unit 310 applies a window having a predetermined size and shape to a predetermined number of previous pixels and peripheral pixels of the previous pixels, and acquires a correlation between each previous pixel and each peripheral pixel within the window. The size and shape of the window may be optionally determined as described above.

In operation 1020, the correlation accumulation unit 320 determines relative locations having high correlation with the previous pixels within the window based on the correlation between each previous pixel and each peripheral pixel within the window.

In operation 1030, the template renewal unit 330 generates a template based on the relative locations having high correlation with the previous pixels within the window. As described above, the template may be generated by selecting locations having correlation accumulation values that exceed a predetermined threshold within the window.

In operation 1040, the context generation unit 120 outputs information regarding probabilities that an MPS and an LPS take place according to context determined based on the generated template, and the arithmetic encoding unit 130 performs binary arithmetic encoding on a current pixel based on the information regarding the probabilities that the MPS and LPS take place.

Figure 11:
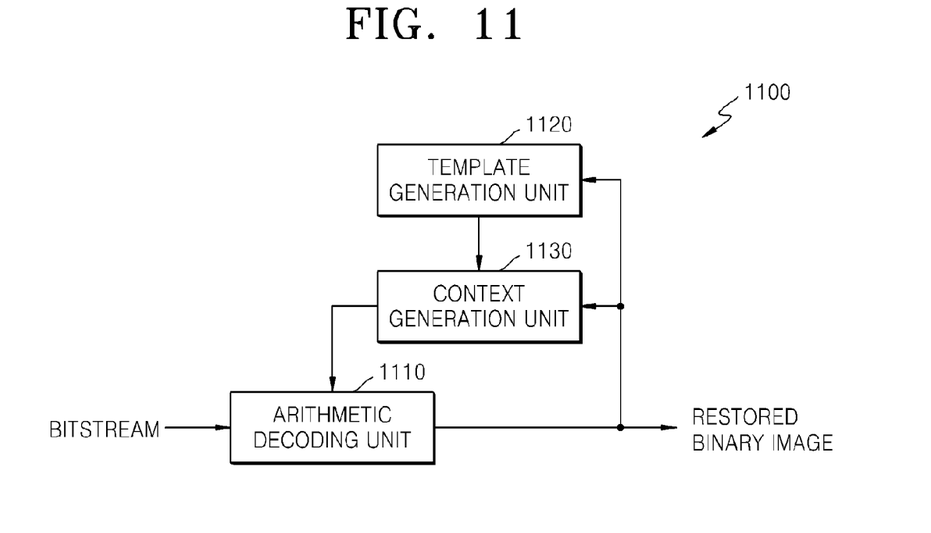
FIG. 11 is a block diagram of a binary image decoding apparatus using an adaptive template according to an exemplary embodiment.

FIG. 11 is a block diagram of a binary image decoding apparatus 1100 using an adaptive template according to an exemplary embodiment.

Referring to FIG. 11, the binary image decoding apparatus 1100 includes a template generation unit 1120 (e.g., template generator), a context generation unit 1130 (e.g., context generator), and an arithmetic decoding unit 1110 (e.g., arithmetic decoder).

The binary image decoding apparatus 1100 according to the present exemplary embodiment may adaptively generate a template from previously decoded previous pixels in the same way as the binary image encoding apparatus 100 of FIG. 1. That is, the template generation unit 1120 applies a window having a predetermined size and shape to a predetermined number of previous pixels and peripheral pixels of the previous pixels, acquires a correlation between each previous pixel and each peripheral pixel within the window, determines relative locations having high correlation with the previous pixels within the window based on the correlation between each previous pixel and each peripheral pixel within the window, and generates a template based on the relative locations having high correlation with the previous pixels within the window. As described above, by using the same window as used in the binary image encoding apparatus 100 of FIG. 1, the template generation unit 1120 of the binary image decoding apparatus 1100 can adaptively generate the template that is to be used to decode the current pixel $S_n$ without transmitting information regarding the template. If the correlation $C(S_n)$ calculated by applying the window to the current pixel $S_n$ is additionally used at an encoding side, the template generation unit 1120 may generate correlation accumulation values with respect to locations within the window by extracting the correlation $C(S_n)$ calculated with respect to the current pixel $S_n$ from a bit stream and adding the correlation $C(S_n)$ to correlation values calculated by using the decoded previous pixels.

The context generation unit 1130 determines an MPS and an LPS in a binary signal of "0" and "1" according to context determined based on peripheral pixels of a current pixel within the template, and outputs probabilities that the determined MPS and LPS take place. Information regarding the MPS and the LPS according to the context and information regarding the probabilities that the MPS and the LPS take place may be stored in a probability table. The probability table may be renewed or updated whenever pixels are decoded.

The arithmetic decoding unit 1110 performs binary arithmetic decoding on the current pixel $S_n$ based on the probabilities that the determined MPS and LPS take place.

Figure 12:
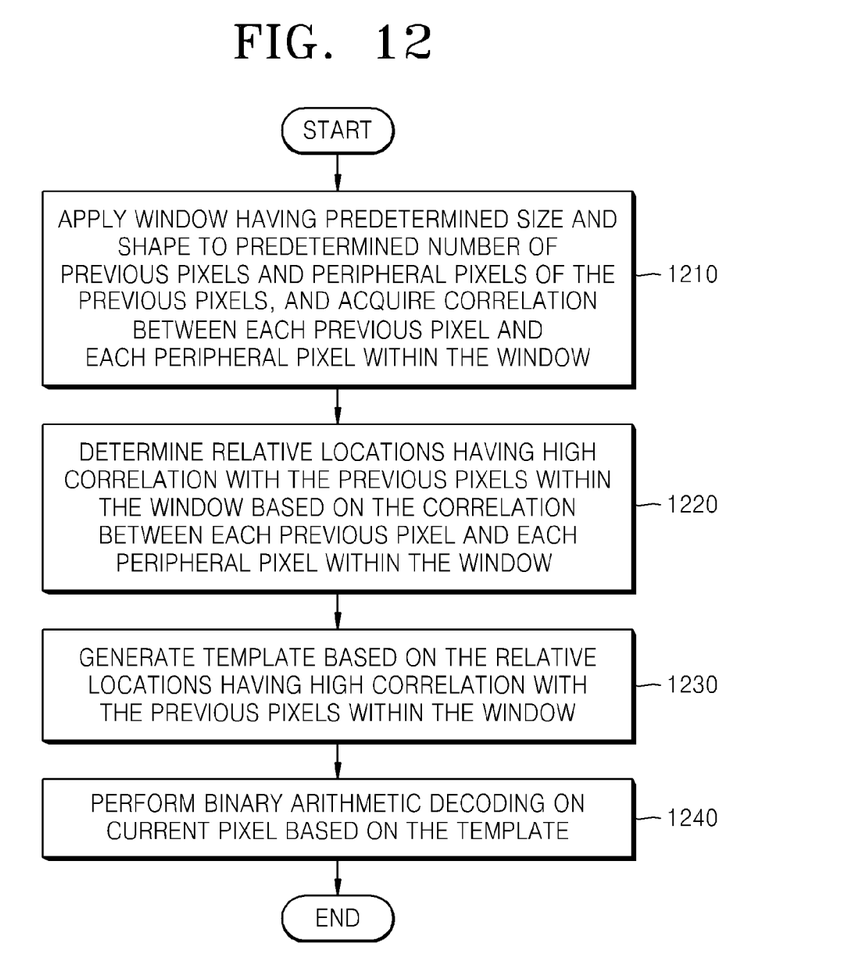
FIG. 12 is a flowchart of a binary image decoding method using an adaptive template according to an exemplary embodiment.

FIG. 12 is a flowchart of a binary image decoding method using an adaptive template according to an exemplary embodiment.

Referring to FIG. 12, in operation 1210, the template generation unit 1120 applies a window having a predetermined size and shape to a predetermined number of previous pixels and peripheral pixels of the previous pixels, and acquires a correlation between each previous pixel and each peripheral pixel within the window.

In operation 1220, the template generation unit 1120 determines relative locations having high correlation with the previous pixels within the window based on the correlation between each previous pixel and each peripheral pixel within the window. In operation 1230, the template generation unit 1120 generates a template based on the relative locations having high correlation with the previous pixels within the window.

In operation 1230, the arithmetic decoding unit 1110 performs binary arithmetic decoding on a current pixel by using the template. More specifically, the arithmetic decoding unit 1110 restores the current pixel from an input bit stream based on information regarding an MPS and an LPS according to context generated by the context generation unit 1130 based on the template and information regarding probabilities that the MPS and LPS take place.

By way of example, the binary image encoding method and apparatus and the binary image decoding method and apparatus according to the exemplary embodiments described above may be applied to an electronic printing system such as a printer, a scanner, a copier, or a similar multifunctional machine. The adaptive template generation method according to the above-described exemplary embodiments may be applied to all codecs to which BAC is applied.

According to an exemplary embodiment, a template is generated in order to efficiently reflect correlations between symbols, thereby enhancing arithmetic operation complexity of BAC and compression efficiency.

According to an exemplary embodiment of the present invention, a template can be adaptively generated based on previously processed symbols at encoding and decoding sides without separate information.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs), and transmission media such as Internet transmission media. Moreover, it is understood that in exemplary embodiments, one or more of the above-described units can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the present general inventive concept as defined by the following claims.

What is claimed is:

1. A binary image encoding method using an adaptive template, the method comprising:
   applying a window having a predetermined size and shape to a predetermined number of previous pixels and peripheral pixels of the previous pixels, and acquiring correlations between the previous pixels and the peripheral pixels within the window;
   determining relative locations having high correlation with the previous pixels within the window based on the acquired correlations;
   generating a template based on the determined relative locations; and
   performing binary arithmetic encoding on a current pixel by using the generated template.

2. The method of claim 1, wherein the acquiring the correlations comprises:
   allocating, according to a determination that a peripheral pixel has a same pixel value as a previous pixel, a first value to the peripheral pixel, and allocating, according to a determination that the peripheral pixel has a different pixel value from the previous pixel, a second value, different from the first value, to the peripheral pixel.

3. The method of claim 1, wherein the determining the relative locations comprises:
   accumulating the correlations between the previous pixels and the peripheral pixels within the window based on the relative locations within the window.

4. The method of claim 3, wherein the determining the relative locations further comprises:
   determining, as the relative locations having the high correlation, locations having correlation accumulation values, corresponding to the accumulated correlations, that exceed a predetermined threshold.

5. The method of claim 1, wherein the generating the template comprises:
   selecting the determined relative locations within the window for a shape of the template.

6. The method of claim 1, wherein the performing the binary arithmetic encoding comprises:
   determining a most probable symbol (MPS) and a least probable symbol (LPS) from among binary signals of "0" and "1," and acquiring probabilities that the determined MPS and the determined LPS take place according to context determined based on peripheral pixels of the current pixel within the template; and
   performing the binary arithmetic encoding on the current pixel based on the acquired probabilities that the determined MPS and the determined LPS take place.

7. A non-transitory computer readable recording medium having recorded thereon a program executable by a computer for performing the method of claim 1.

8. A binary image decoding method using an adaptive template, the method comprising:
   applying a window having a predetermined size and shape to a predetermined number of previous pixels and peripheral pixels of the previous pixels, and acquiring correlations between the previous pixels and the peripheral pixels within the window;
   determining relative locations having high correlation with the previous pixels within the window based on the acquired correlations;
   generating a template based on the determined relative locations; and
   performing binary arithmetic decoding on a current pixel by using the generated template.

9. The method of claim 8, wherein the acquiring the correlations comprises:
   allocating, according to a determination that a peripheral pixel has a same pixel value as a previous pixel, a first value to the peripheral pixel, and allocating, according to a determination that the peripheral pixel has a different pixel value from the previous pixel, a second value, different from the first value, to the peripheral pixel.

10. The method of claim 8, wherein the determining the relative locations comprises:
   accumulating the correlations between the previous pixels and the peripheral pixels within the window based on the relative locations within the window.

11. The method of claim 10, wherein determining the relative locations further comprises:
   determining, as the relative locations having high correlation, locations having correlation accumulation values, corresponding to the accumulated correlations, that exceed a predetermined threshold.

12. The method of claim 8, wherein the generating the template comprises:
   selecting the determined relative locations within the window for a shape of the template.

13. The method of claim 8, wherein the performing the binary arithmetic decoding comprises:
   determining a most probable symbol (MPS) and a least probable symbol (LPS) from among binary signals of "0" and "1," and acquiring probabilities that the determined MPS and the determined LPS take place according to context determined based on peripheral pixels of the current pixel within the template; and
   performing the binary arithmetic decoding on the current pixel based on the acquired probabilities that the determined MPS and the determined LPS take place.

14. A non-transitory computer readable recording medium having recorded thereon a program executable by a computer for performing the method of claim 8.

15. A binary image encoding apparatus using an adaptive template, the apparatus comprising:
   a correlation acquirer which applies a window having a predetermined size and shape to a predetermined number of previous pixels and peripheral pixels of the previous pixels, and acquires correlations between the previous pixels and the peripheral pixels within the window;
   a correlation accumulator which determines relative locations having high correlation with the previous pixels within the window based on the acquired correlations;
   a template renewer which generates a template based on the determined relative locations; and
   an arithmetic encoder which performs binary arithmetic encoding on a current pixel by using the generated template.

16. A binary image decoding apparatus using an adaptive template, the apparatus comprising:
   a correlation acquirer which applies a window having a predetermined size and shape to a predetermined number of previous pixels and peripheral pixels of the previous pixels, and acquires correlations between the previous pixels and the peripheral pixels within the window;
   a correlation accumulator which determines relative locations having high correlation with the previous pixels within the window based on the acquired correlations;
   a template renewer which generates a template based on the determined relative locations; and
   an arithmetic decoder which performs binary arithmetic decoding on a current pixel by using the generated template.

17. A binary image encoding or decoding method using an adaptive template, the method comprising:
   adaptively generating a template based on correlations between previous pixels and peripheral pixels; and
   performing binary encoding or decoding on a current pixel by using the generated template,
   wherein the adaptively generating the template comprises:
   determining a size and a shape of the template according to accumulated correlations between the previous pixels and the peripheral pixels.

18. The method of claim 17, wherein the performing the binary encoding or decoding comprises:
   determining a most probable symbol (MPS) and a least probable symbol (LPS) from among binary signals of "0" and "1," and acquiring probabilities that the determined MPS and the determined LPS take place according to context determined based on peripheral pixels of the current pixel within the template; and
   performing binary arithmetic encoding or decoding on the current pixel based on the acquired probabilities that the determined MPS and the determined LPS take place.

19. A non-transitory computer readable recording medium having recorded thereon a program executable by a computer for performing the method of claim 17.

* * * * *